United States Patent
Chang

(10) Patent No.: US 8,654,256 B2
(45) Date of Patent: Feb. 18, 2014

(54) VIDEO PROCESSING APPARATUS FOR GENERATING MULTIPLE VIDEO OUTPUTS BY EMPLOYING HARDWARE SHARING TECHNIQUE

(75) Inventor: Te-Hao Chang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/537,069

(22) Filed: Jun. 29, 2012

(65) Prior Publication Data

US 2013/0162912 A1 Jun. 27, 2013

Related U.S. Application Data

(60) Provisional application No. 61/579,669, filed on Dec. 23, 2011.

(51) Int. Cl.
*H04N 9/76* (2006.01)
*G06F 15/00* (2006.01)
*G06T 1/00* (2006.01)
*H04N 7/18* (2006.01)

(52) U.S. Cl.
USPC ............................... 348/598; 345/501; 725/78

(58) Field of Classification Search
None
See application file for complete search history.

(56) References Cited

U.S. PATENT DOCUMENTS 5,384,912 A * 1/1995 Ogrinc et al. ................. 345/501
2010/0118982 A1* 5/2010 Chatterjee et al. ........ 375/240.29
2010/0138880 A1* 6/2010 Reed et al. ...................... 725/78

* cited by examiner

*Primary Examiner* — Jefferey Harold
*Assistant Examiner* — Sean Haiem
(74) *Attorney, Agent, or Firm* — Winston Hsu; Scott Margo

(57) ABSTRACT

A video processing apparatus includes a first video processing block, a second video processing block and a third video processing block. The first video processing block has a plurality of first video processing circuits disposed at a first video processing path, and is arranged for generating a first video output according to a first video input. The second video processing block has a plurality of second video processing circuits disposed at a second video processing path parallel with the first video processing path, and is arranged for generating an intermediate video output in response to a second video input, wherein an output signal of one of the first video processing circuits acts as the second video input fed into one of the second video processing circuits. The third video processing block is arranged for generating the second video output according to the intermediate video output.

20 Claims, 5 Drawing Sheets

VIDEO PROCESSING APPARATUS FOR GENERATING MULTIPLE VIDEO OUTPUTS BY EMPLOYING HARDWARE SHARING TECHNIQUE

CROSS REFERENCE TO RELATED APPLICATIONS

This application claims the benefit of U.S. provisional application No. 61/579,669, filed on Dec. 23, 2011 and incorporated herein by reference.

BACKGROUND

The disclosed embodiments of the present invention relate to processing video inputs, and more particularly, to a video processing apparatus for generating multiple video outputs by employing a hardware sharing technique.

The display apparatus (e.g., a display screen of a television) generally has a designated resolution for displaying the video content (e.g., a TV program). When the resolution of the video input is different from the resolution of the display apparatus, a scaler is implemented in a video processing apparatus to adjust the resolution of the video input to match the resolution of the display apparatus. When there is a need to provide multiple video outputs (e.g., a primary video output and a secondary video output) for video playback on display apparatuses with different resolution settings, the conventional video processing apparatus uses a scaler for processing the primary video output and an additional scaler for processing the secondary video output. For example, the primary video output is fed into the additional scaler to produce the secondary video output, where the primary video output and the secondary video output have the same video content but different resolution. As the additional scaler dedicated to processing the secondary video output is added to the video processing apparatus, the production cost is inevitably increased.

There is a need for an innovative design which is capable of providing an additional video output for video playback on another display apparatus without using any additional scaler.

SUMMARY

In accordance with exemplary embodiments of the present invention, a video processing apparatus for generating multiple video outputs by employing a hardware sharing technique is proposed to solve the above-mentioned problems.

According to a first aspect of the present invention, an exemplary video processing apparatus for generating a plurality of video outputs is disclosed. The video outputs include a first video output and a second video output. The exemplary video processing apparatus includes a first video processing block, a second video processing block and a third video processing block. The first video processing block includes a plurality of first video processing circuits disposed at a first video processing path, and is arranged for receiving a first video input and generating the first video output according to the first video input. The second video processing block includes a plurality of second video processing circuits disposed at a second video processing path that is parallel with the first video processing path, and is arranged for receiving a second video input and generating an intermediate video output in response to the second video input, wherein an output signal of one of the first video processing circuits acts as the second video input fed into one of the second video processing circuits. The third video processing block is arranged for generating the second video output according to the intermediate video output.

According to a second aspect of the present invention, an exemplary video processing apparatus for generating a plurality of video outputs is disclosed. The video outputs include a first video output and a second video output. The exemplary video processing apparatus includes a first video processing block, a second video processing block and a third video processing block. The first video processing block includes a plurality of first video processing circuits, and is arranged for generating the first video output according to a first video input and a first intermediate video output when the video processing apparatus operates in a first mode, and generating the first video output according to the first video input when the video processing apparatus operates in a second mode. The second video processing block includes a plurality of second video processing circuits, and is arranged for generating the first intermediate video output when the video processing apparatus operates in the first mode, and generating a second intermediate video output according to a second video input when the video processing apparatus operates in the second mode, wherein an output signal of one of the first video processing circuits is fed into one of the second video processing circuits when the video processing apparatus operates in the second mode. The third video processing block is arranged for generating the second video output according to the second intermediate video output.

According to a third aspect of the present invention, an exemplary video processing apparatus for generating a plurality of video outputs is disclosed. The video outputs include a first video output and a second video output. The exemplary video processing apparatus includes a first video processing block, a second video processing block and a third video processing block. The first video processing block is arranged for generating the first video output according to a first video input and a first intermediate video output when the video processing apparatus operates in a first mode, and generating the first video output according to the first video input when the video processing apparatus operates in a second mode. The second video processing block is arranged for generating the first intermediate video output when the video processing apparatus operates in the first mode, and generating a second intermediate video output when the video processing apparatus operates in the second mode. The third video processing block is arranged for generating the second video output according to the second intermediate video output, and outputting the second video output to a wireless communication transmitter.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
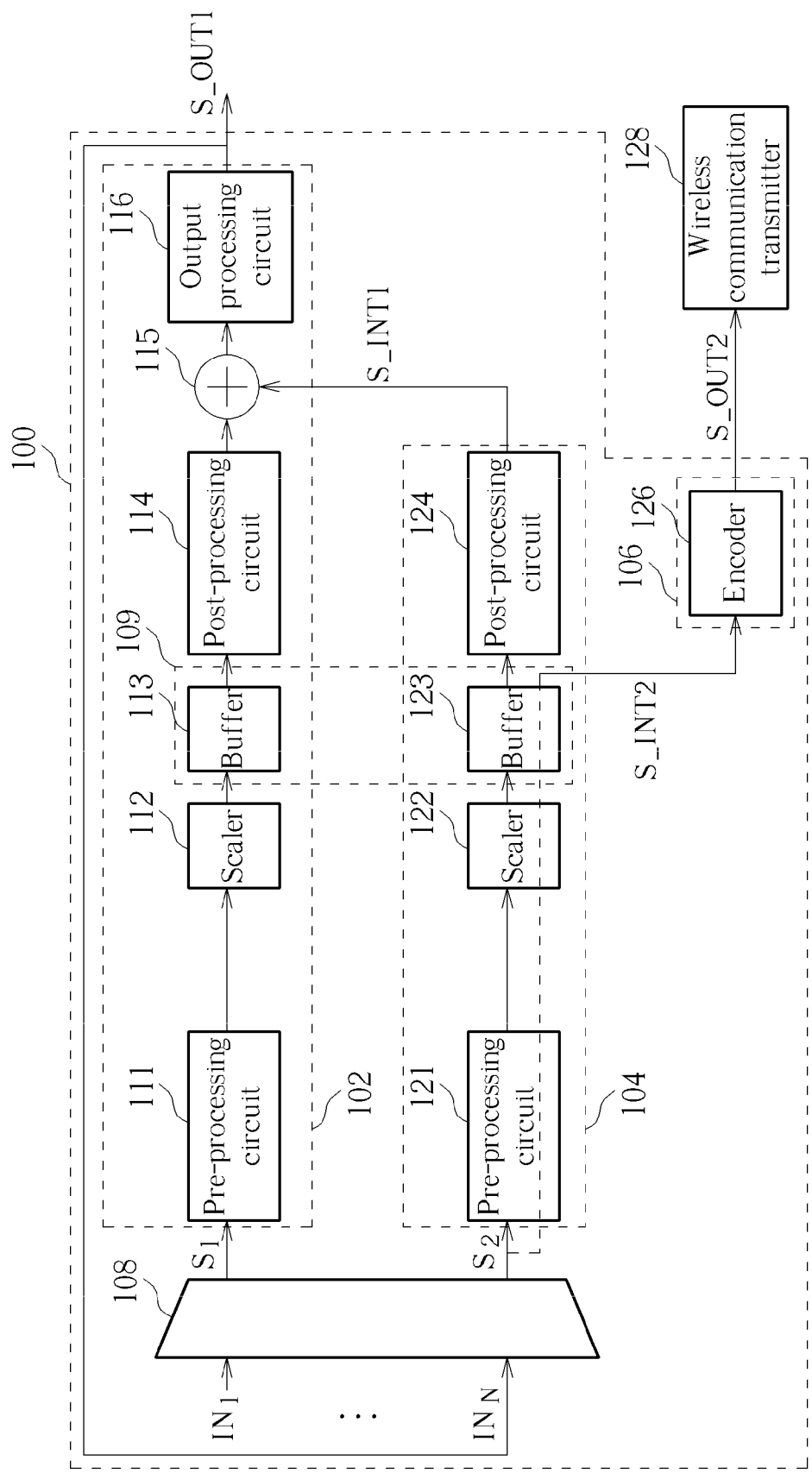
FIG. 1 is a diagram illustrating a video processing apparatus according to a first exemplary embodiment of the present invention.

FIG. 1 is a diagram illustrating a video processing apparatus according to a first exemplary embodiment of the present invention. The video processing apparatus 100 is capable of generating a plurality of video outputs, including a first video output S_OUT1 and a second video output S_OUT2, for video playback on a plurality of video output devices. The video output devices may be equipped with display apparatuses having different resolution settings. For example, one of the video output devices may be a television, and another of the video output devices may be a mobile phone. Besides, the video processing apparatus 100 may be a video chip disposed in the television. Hence, in addition to generating the first video output S_OUT1 for video playback of a specific video content on the television in which the video processing apparatus 100 is disposed, the video processing apparatus 100 may also generate the second video output S_OUT2 to the mobile phone for video playback of the same specific video content. In this way, the user may view the same video content currently displayed on the television by using his/her mobile phone without staying in front of the television. It should be noted that this is only one possible application of the proposed video processing apparatus 100. In practice, any application employing the proposed video processing apparatus 100 falls within the scope of the present invention.

As shown in FIG. 1, the video processing apparatus 100 includes a first video processing block 102, a second video processing block 104, a third video processing block 106, and a video input multiplexer 108. The first video processing block 102 includes a plurality of first video processing circuits disposed at a first video processing path. In this embodiment, the first video processing circuits have a pre-processing circuit 111, a scaler 112, a buffer 113, a post-processing circuit 114, a combining circuit 115, and an output processing circuit 116. The first video processing block 102 is arranged for receiving a first video input S1 and generating the first video output S_OUT1 according to at least the first video input S1. More specifically, the first video processing block 102 generates the first video output S_OUT1 according to the first video input S1 when the video processing apparatus 100 operates in a first mode, and generates the first video output S_OUT1 according to the first video input S1 and a first intermediate video input S_INT1 generated from the second video processing block 104 when the video processing apparatus 100 operates in a second mode.

The pre-processing circuit 111 performs a pre-processing operation upon the incoming first video input S1, and generates a pre-processed video input to the scaler 112. The scaler 112 performs a scaling operation upon the pre-processed video input, and generates a scaled video input to the buffer 113. The post-processing circuit 114 performs a post-processing operation upon the scaled video input read from the buffer 113, and generates a post-processed video output to the combining circuit 115. When the video processing apparatus 100 operates in the first mode, the combining circuit 115 generates a combined video output to the output processing circuit 116 by combining the post-processed video output and the first intermediate video output S_INT1 (e.g., overlaying the first intermediate video output S_INT1 on the post-processed video output), and the output processing circuit 116 generates the first video output S_OUT1 by applying video quality improvement or adding on-screen display (OSD) information to the combined video output. When the video processing apparatus 100 operates in the second mode, the combining circuit 115 bypasses the post-processed video output to the output processing circuit 116, and the output processing circuit 116 generates the first video output S_OUT1 by applying video quality improvement or adding OSD information to the post-processed video output.

The second video processing block 104 is arranged for receiving a second video input and generating the first intermediate video output S_INT1 in response to the second video input S2 when the video processing apparatus 100 operates in the first mode. Besides, the second video processing block 104 is further arranged for generating a second intermediate video output S_INT1 in response to the second video input S2 when the video processing apparatus 100 operates in the second mode. It should be noted that the second video input S2 may correspond to different video contents when the video processing apparatus 100 operates in different modes.

The second video processing block 104 includes a plurality of second video processing circuits disposed at a second video processing path that is parallel with the first video processing path. In this embodiment, the second video processing circuits have a pre-processing circuit 121, a scaler 122, a buffer 123, and a post-processing circuit 124. By way of example, but not limitation, the buffers 113 and 123 may be allocated in the same storage device 109, such as a dynamic random access memory (DRAM). The pre-processing circuit 121 performs a pre-processing operation upon the incoming second video input S2, and generates a pre-processed video input to the scaler 122. The scaler 122 performs a scaling operation upon the pre-processed video input, and generates a scaled video input to the buffer 123. When the video processing apparatus 100 operates in the first mode, the post-processing circuit 124 is enabled to perform a post-processing operation upon the scaled video input read from the buffer 123, and generates a post-processed video output as the first intermediate video output S_INT1 to the combining circuit 115. When the video processing apparatus 100 operates in the second mode, the post-processing circuit 124 is disabled and the scaled video input in the buffer 123 is outputted as the second intermediate video output S_INT2 to the third video processing block 106.

When the video processing apparatus 100 operates in the second mode, the third video processing block 106 is enabled and arranged for generating the second video output S_OUT2 according to the second intermediate video output S_INT2 provided by the second video processing block. In this embodiment, the third video processing block 106 includes an encoder (e.g., an H.264/MPEG encoder) 126 arranged for encoding the second intermediate video output S_INT2 into the second video output S_OUT2, and outputting the second video output S_OUT2 to a wireless communication transmitter 128. By way of example, the wireless communication transmitter 128 is a WiFi transmitter for delivering the second video output S_OUT2 via WiFi transmission.

In one exemplary application of the video processing apparatus 100, the video processing apparatus 100 enters the first mode when a picture-on-picture (POP) function is enabled, and enters the second mode when a WiFi Push function is enabled. Therefore, when the WiFi Push function is enabled, the second video output S_OUT2 is forwarded to a WiFi receiver disposed in an electronic device (e.g., a mobile phone) via the WiFi transmission. This allows the user to view the video content carried by the second video output S_OUT2 on the electronic device (e.g., the mobile phone) while the same video content carried by the first video output S_OUT1 is being displayed on another electronic device (e.g., a television).

As shown in FIG. 1, there is a video input multiplexer 108 arranged for receiving a plurality of video inputs $IN_1$-$IN_N$, outputting one of the video inputs $IN_1$-$IN_N$ as the first video input S1 to a leading first video processing circuit (e.g., the pre-processing circuit 111), and outputting another of the video inputs $IN_1$-$IN_N$ as the second video input S2 to a leading second video processing circuit (e.g., the pre-processing circuit 121). When the video processing apparatus 100 operates in the first mode due to the enabled POP function, the video input multiplexer 108 selects two video inputs corresponding to different video sources (i.e., different video contents/channels) as the first video input S1 and the second video input S2. As the POP function is enabled, the first video processing block 102 and the second video processing block 104 collaborate to provide the first video output S_OUT1 carrying the video content of the first video input S1 overlaid by the video content of the second video input S2. As a person skilled in the art can readily understand operation of the processing circuits involved in generating the first video output S_OUT1 in response to the enabled POP function, further description is omitted here for brevity.

As can be seen from FIG. 1, an output signal of one of the first video processing circuits (e.g., the first video output S_OUT1 generated from the output processing circuit 116) is fed back to act as one video input $IN_N$. When the video processing apparatus 100 operates in the second mode due to the enabled WiFi function, the video input multiplexer 108 selects one video input corresponding to a video content/channel as the first video input S1, and selects the video input $IN_N$ provided by the first video processing block 102 as the second video input S2. In this embodiment, each second video processing circuit preceding the scaler 122 is configured to bypass the second video input S2 to a next second video processing circuit. Hence, the pre-processing circuit 121 bypasses the second video input S2 to the scaler 122. In this way, the scaler 122 performs a scaling operation upon the second video input S2 which is identical to the first video output S_OUT1. Therefore, the first video output S_OUT1 and the second video output S_OUT2 would have the same video content but different resolutions.

As can be seen from FIG. 1, the scaler 122 and the buffer 123 originally designed for generating an intermediate video output required by the POP function are re-used for generating the second video output S_OUT required by the WiFi Push function. Due to the hardware sharing technique employed by the proposed video processing apparatus 100, no additional scaler is needed and the production cost is reduced correspondingly.

In above embodiment, when the WiFi Push function is enabled, the first video output S_OUT1 generated from the output processing circuit 116 acts as the second video input S2 fed into the pre-processing circuit 121 of the second video processing block 104. However, this is for illustrative purposes only, and is not meant to be a limitation of the present invention. That is, any video processing apparatus re-using at least a portion (i.e., part or all) of second video processing circuits of the second video processing block to process an output signal of one of the first video processing circuits of the first video processing block for generating an additional video output falls within the scope of the present invention.

Figure 2:
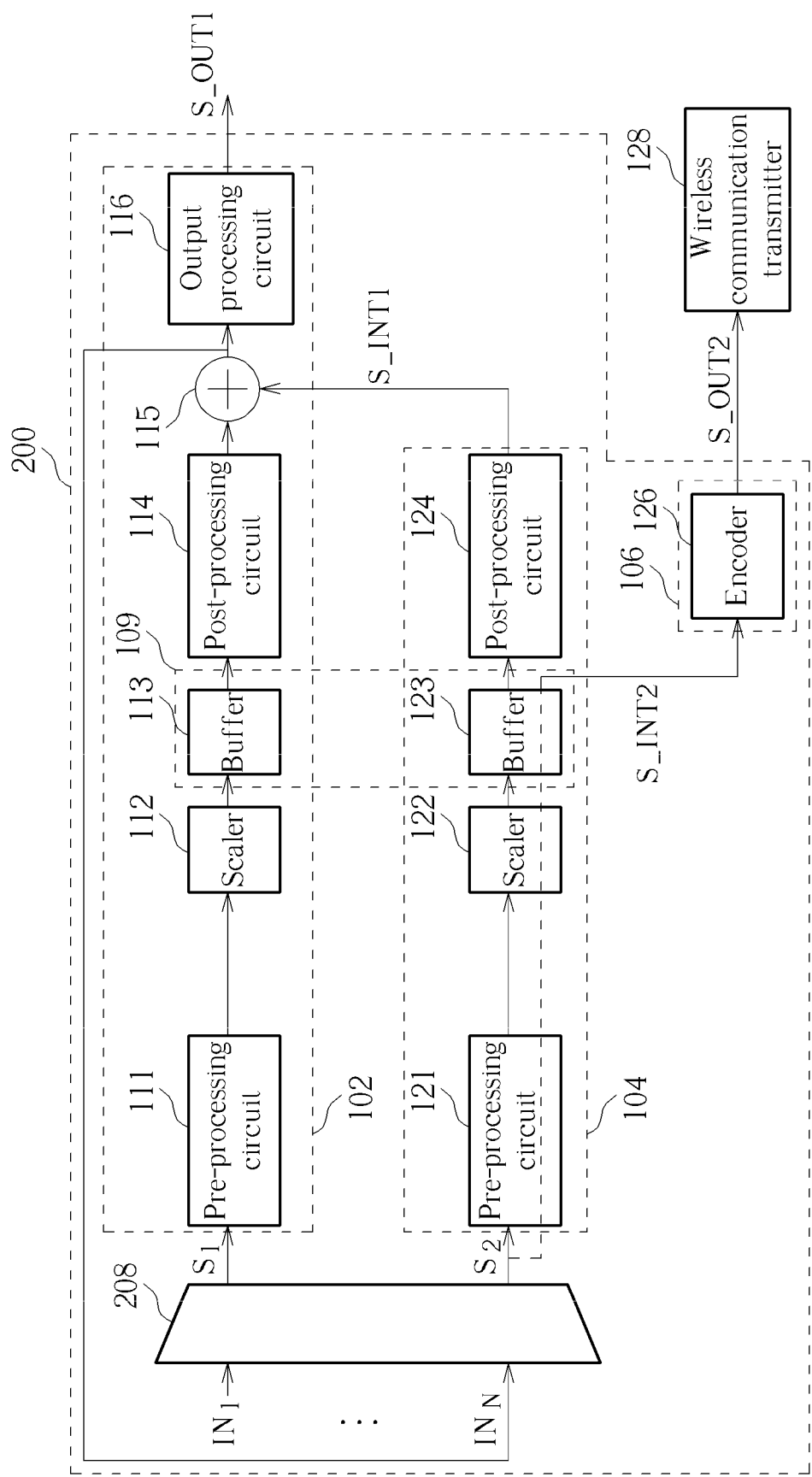
FIG. 2 is a diagram illustrating a video processing apparatus according to a second exemplary embodiment of the present invention.

Please refer to FIG. 2, which is a diagram illustrating a video processing apparatus according to a second exemplary embodiment of the present invention. The structure of the video processing apparatus 200 is similar to the structure of the video processing apparatus 100. The major difference between the video processing apparatuses 100 and 200 is that a video input multiplexer 208 of the video processing apparatus 200 receives an output signal of the combining circuit 115 (i.e., an input signal of the output processing circuit 116) as one video input $IN_N$, and outputs the video input $IN_N$ as the second video input S2 to the pre-processing circuit 121 of the second video processing block 104 when the video processing apparatus 200 enters the second mode. As mentioned above, the output processing circuit 116 may add OSD information to the first video output S_OUT1. Because the second video input S2 is the input signal of the output processing circuit 116 rather than the output signal of the output processing circuit 116, the user may view an OSD-free video convent on a mobile phone through WiFi Push of the second video output S_OUT2 while a television is displaying the video content of the first video output S_OUT1.

In above embodiments shown in FIG. 1 and FIG. 2, the video input multiplexer 108/208 is responsible for providing the first video input S1 to the leading first video processing circuit disposed at the first video processing path and providing the second video input S2 to the leading second video processing circuit disposed at the second video processing path. However, when the video processing apparatus 100/200 enters the second mode, each second video processing circuit preceding the scaler 122 is not required for generating the second video output S_OUT2 and thus directly bypasses the second video input S2 to a next second video processing circuit. In an alternative design, the second video output S_OUT2 may be directly fed into the scaler 122.

Figure 3:
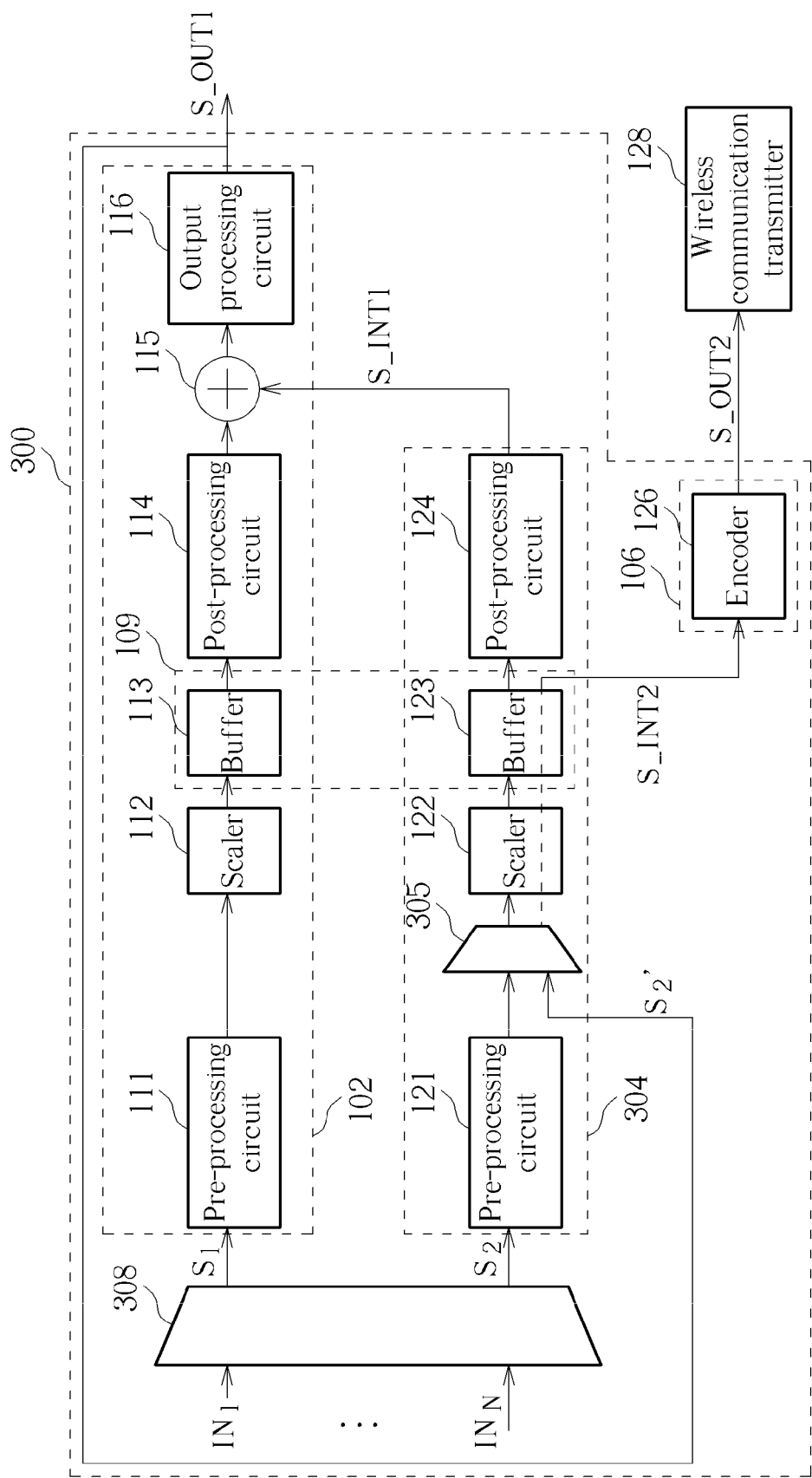
FIG. 3 is a diagram illustrating a video processing apparatus according to a third exemplary embodiment of the present invention.

Please refer to FIG. 3, which is a diagram illustrating a video processing apparatus according to a third exemplary embodiment of the present invention. The structure of the video processing apparatus 300 is similar to the structure of the video processing apparatus 100. The major difference is that the video processing apparatus 300 has two video input multiplexers 305 and 308 implemented therein. Regarding the video input multiplexer 308, none of the video inputs $IN_1$-$IN_N$ is derived from an output signal of one of the first video processing circuits of the first video processing block 102. Regarding the video input multiplexer 305 in the second video processing block 304, it is arranged for receiving a plurality of video inputs, including an output signal generated from a preceding second video processing circuit (e.g., a pre-processed video input generated by the pre-processing circuit 121 which performs a pre-processing operation upon a second video input S2 provided by the preceding video input multiplexer 108) and an output signal of one of the first video processing circuits (e.g., the first video output S_OUT1 generated from the output processing circuit 116). The video input multiplexer 305 outputs the output signal of the pre-processing circuit 121 to the scaler 122 when the video processing apparatus 300 operates in the first mode, and outputs the first video output S_OUT1 as a second video input S2' to the scaler 122 when the video processing apparatus 300 operates in the second mode. The same objective of the generating the second video output S_OUT2 identical to that shown in FIG. 1 is achieved.

Figure 4:
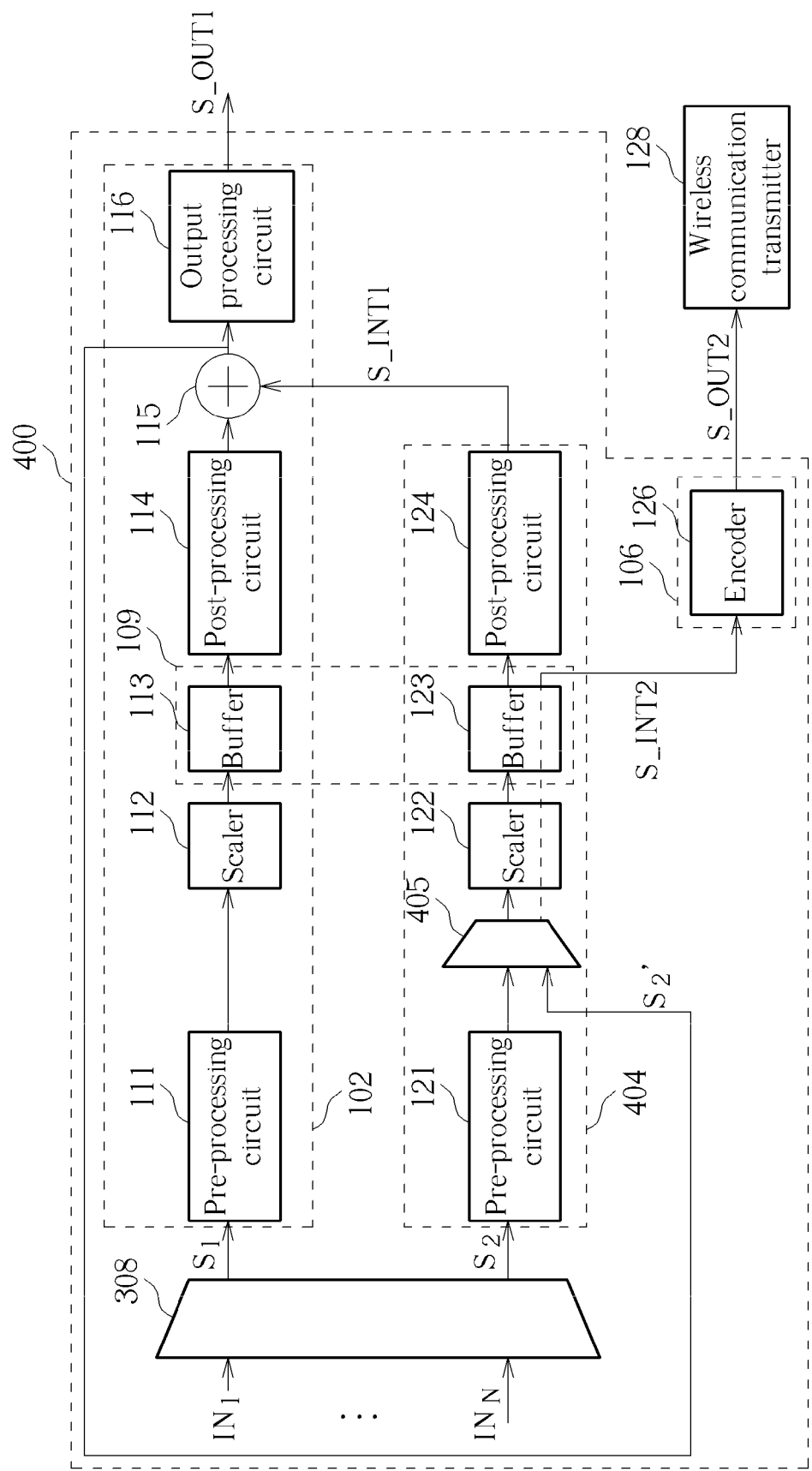
FIG. 4 is a diagram illustrating a video processing apparatus according to a fourth exemplary embodiment of the present invention.

FIG. 4 is a diagram illustrating a video processing apparatus according to a fourth exemplary embodiment of the present invention. The structure of the video processing apparatus 400 is similar to the structure of the video processing apparatus 300. In this embodiment, the second video processing block 404 has a video input multiplexer 405 arranged for receiving a plurality of video inputs, including an output signal generated from a preceding second video processing circuit (e.g., a pre-processed video input generated by the pre-processing circuit 121 which performs a pre-processing operation upon a second video input S2 provided by the preceding video input multiplexer 108) and an output signal of one of the first video processing circuits (e.g., an output signal of the combining circuit 115). The video input multiplexer 405 outputs the output signal of the pre-processing circuit 121 to the scaler 122 when the video processing apparatus 400 operates in the first mode, and outputs the output signal of the combining circuit 115 (i.e., an input signal of the output processing circuit 116) as a second video input S2' to the scaler 122 when the video processing apparatus 400 operates in the second mode. The same objective of the generating the second video output S_OUT2 identical to that shown in FIG. 2 is achieved.

As mentioned above, due to hardware sharing technique employed by the video processing apparatus, the second video processing block originally designed for POP function may be re-used for the WiFi Push function for transmission of an additional video output derived from processing an output signal of one of the first video processing circuits of the first video processing block. However, this is for illustrative purposes only, and is not meant to be a limitation of the present invention. In an alternative design, the second video processing block may be re-used for a different purpose.

Figure 5:
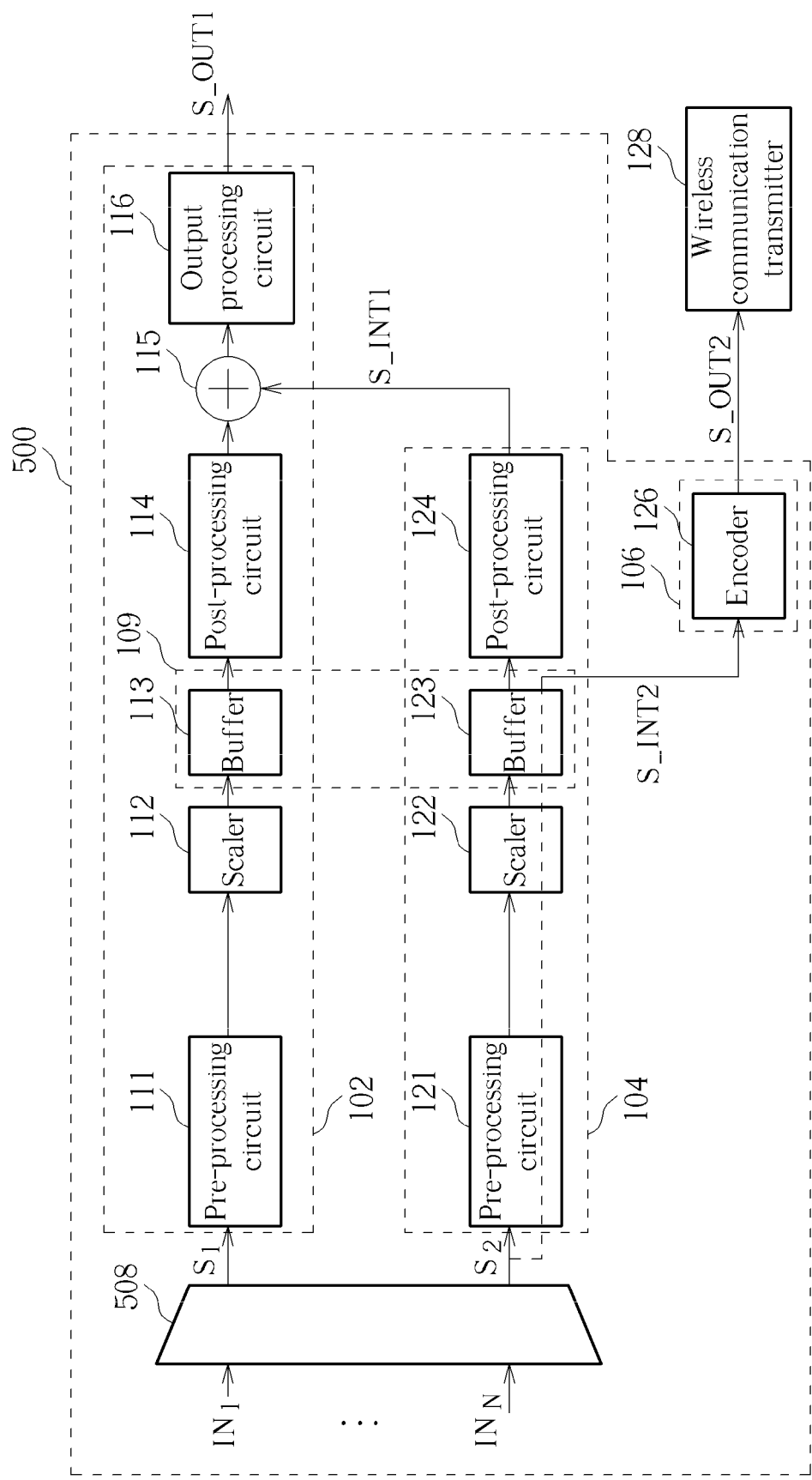
FIG. 5 is a diagram illustrating a video processing apparatus according to a fifth exemplary embodiment of the present invention.

FIG. 5 is a diagram illustrating a video processing apparatus according to a fifth exemplary embodiment of the present invention. The major difference between the video processing apparatuses 100 and 500 is that none of the video inputs $IN_1$-$IN_N$ of the video input multiplexer 508 is derived from an output signal of one of the first video processing circuits included in the first video processing block 102. For example, the video inputs $IN_1$-$IN_N$ received by the video input multiplexer 508 are derived from distinct video sources. This implies that the first video output S_OUT1 and the second video output S_OUT2 do not have the same video content as the first video input S1 fed into the pre-processing circuit 111 and the second video input S2 fed into the pre-processing circuit 121 correspond to different video sources (e.g., different video contents/channels). In this embodiment, the video processing apparatus 500 enters the first mode when a POP function is enabled. Therefore, the first video output S_OUT1 would carry a video content of the first video input S1 (which may a primary video) overlaid by a video content of the second video input S2 (which may a secondary video).

In addition, the video processing apparatus 500 enters the second mode when a WiFi Push function is enabled. Therefore, the post-processing circuit 124 is disabled such that the generation of the first intermediate video output S_INT1 is stopped, and the second intermediate video output S_INT2 derived from processing the same second video input S2 (which may be the secondary video) is read from the buffer 123 and fed into the encoder 126 of the third video processing block 106. In this way, the first video output S_OUT1 carries a video content of the first video input S1 (which may be the primary video) only, and the second video output S_OUT2 carries a video content of the second video input S2 (which may be the secondary video) only. Therefore, the user can view the video content of the second video input S2 displayed on one electronic device (e.g., a mobile phone) through WiFi Push while another electronic device (e.g., a television) is displaying the video content of the first video input S1, where the video content of the second video input S2 is different from the video content of the first video input S1. As the primary video and the secondary video are displayed on different electronic devices respectively, this can improve user's viewing experience greatly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus for generating a plurality of video outputs, the video outputs including a first video output and a second video output, the video processing apparatus comprising:
    a first video processing block, including a plurality of first video processing circuits disposed at a first video processing path, the first video processing block arranged for receiving a first video input and generating the first video output according to the first video input;
    a second video processing block, including a plurality of second video processing circuits disposed at a second video processing path that is parallel with the first video processing path, the second video processing block arranged for receiving a second video input and generating an intermediate video output in response to the second video input, wherein an output signal of one of the first video processing circuits acts as the second video input fed into one of the second video processing circuits, and the intermediate video output is not transmitted to the first video processing block for further processing; and
    a third video processing block, arranged for generating the second video output according to the intermediate video output.

2. The video processing apparatus of claim 1, further comprising:
    a video input multiplexer, arranged for receiving a plurality of video inputs including the second video input, and selectively outputting the second video input to a leading second video processing circuit disposed at the second video processing path.

3. The video processing apparatus of claim 2, wherein the second video processing circuits have a scaler arranged for scaling the second video input to generate the intermediate video output, and each second video processing circuit preceding the scaler is configured to bypass the second video input to a next second video processing circuit.

4. The video processing apparatus of claim 1, wherein the second video processing circuits have a video input multiplexer; the video input multiplexer is arranged for receiving a plurality of video inputs including an output signal generated from a preceding second video processing circuit and the second video input, and selectively outputting the second video input to a following second video processing circuit.

5. The video processing apparatus of claim 4, wherein the following second video processing circuit is a scaler arranged for scaling the second video input to generate the intermediate video output.

6. The video processing apparatus of claim 1, wherein the first video processing circuits have a combining circuit arranged for combining an output signal generated from a preceding first video processing circuit and an output signal generated from a last second video processing circuit when the second video processing block is not used for generating the intermediate video output.

7. The video processing apparatus of claim 1, wherein the third video processing block is further arranged for outputting the second video output to a wireless communication transmitter.

8. The video processing apparatus of claim 7, wherein the wireless communication transmitter is a WiFi transmitter.

9. A video processing apparatus for generating a plurality of video outputs, the video outputs including a first video output and a second video output, the video processing apparatus comprising:
a first video processing block, including a plurality of first video processing circuits, the first video processing block arranged for generating the first video output according to a first video input and a first intermediate video output when the video processing apparatus operates in a first mode, and generating the first video output according to the first video input when the video processing apparatus operates in a second mode;
a second video processing block, including a plurality of second video processing circuits, the second video processing block arranged for generating the first intermediate video output according to one second video input when the video processing apparatus operates in the first mode, and generating a second intermediate video output according to another second video input when the video processing apparatus operates in the second mode, wherein an output signal of one of the first video processing circuits is fed into one of the second video processing circuits as the another second video input when the video processing apparatus operates in the second mode, and the second intermediate video output is not transmitted to the first video processing block for further processing when the video processing apparatus operates in the second mode; and
a third video processing block, arranged for generating the second video output according to the second intermediate video output.

10. The video processing apparatus of claim 9, further comprising:
a video input multiplexer, arranged for receiving a plurality of video inputs including the another second video input, and arranged for outputting the another second video input to a leading second video processing circuit disposed at the second video processing path when the video processing apparatus operates in the second mode.

11. The video processing apparatus of claim 10, wherein the second video processing circuits have a scaler arranged for scaling the another second video input to generate the second intermediate video output, and each second video processing circuit preceding the scaler is configured to bypass the another second video input to a next second video processing circuit.

12. The video processing apparatus of claim 9, wherein the second video processing circuits have a video input multiplexer; the video input multiplexer is arranged for receiving a plurality of video inputs including an output signal generated from a preceding second video processing circuit and the another second video input, and arranged for outputting the another second video input to a following second video processing circuit when the video processing apparatus operates in the second mode.

13. The video processing apparatus of claim 12, wherein the following second video processing circuit is a scaler arranged for scaling the another second video input to generate the second intermediate video output.

14. The video processing apparatus of claim 9, wherein the third video processing block is further arranged for outputting the second video output to a wireless communication transmitter.

15. The video processing apparatus of claim 14, wherein the wireless communication transmitter is a WiFi transmitter.

16. The video processing apparatus of claim 9, wherein the video processing apparatus enters the first mode when a picture-on-picture (POP) function is enabled, and enters the second mode when a WiFi Push function is enabled.

17. A video processing apparatus for generating a plurality of video outputs, the video outputs including a first video output and a second video output, the video processing apparatus comprising:
a first video processing block, arranged for generating the first video output according to a first video input and a first intermediate video output when the video processing apparatus operates in a first mode, and generating the first video output according to the first video input when the video processing apparatus operates in a second mode;
a second video processing block, arranged for generating the first intermediate video output when the video processing apparatus operates in the first mode, and generating a second intermediate video output when the video processing apparatus operates in the second mode; and
a third video processing block, arranged for generating the second video output according to the second intermediate video output, and outputting the second video output to a wireless communication transmitter.

18. The video processing apparatus of claim 17, wherein the second video processing block generates the first intermediate video output according to a second video input when the video processing apparatus operates in the first mode, and generating the second intermediate video output according to the second video input when the video processing apparatus operates in the second mode.

19. The video processing apparatus of claim 18, wherein the first video input and the second video input correspond to distinct video sources when the video processing apparatus operates in the second mode.

20. The video processing apparatus of claim 17, wherein the video processing apparatus enters the first mode when a picture-on-picture (POP) function is enabled, and enters the second mode when a WiFi Push function is enabled.

* * * * *